(12) United States Patent
Granlund et al.

(10) Patent No.: US 11,772,049 B2
(45) Date of Patent: Oct. 3, 2023

(54) GAS SEPARATION DEVICE

(71) Applicant: HYDROGEN MEM-TECH AS [NO/NO], Trondheim (NO)

(72) Inventors: Knut Harald Granlund, Trondheim (NO); Frode Roness, Trondheim (NO); Nils Andreas Eggen, Trondheim (NO); Thomas Reinertsen, Trondheim (NO)

(73) Assignee: HYDROGEN MEM-TECH AS [NO/NO], Trondheim (NO)

( * ) Notice: Subject to any disclaimer, the term of this patent is extended or adjusted under 35 U.S.C. 154(b) by 279 days.

(21) Appl. No.: 17/259,897

(22) PCT Filed: Jul. 12, 2019

(86) PCT No.: PCT/EP2019/068893
§ 371 (c)(1),
(2) Date: Jan. 12, 2021

(87) PCT Pub. No.: WO2020/012018
PCT Pub. Date: Jan. 16, 2020

(65) Prior Publication Data
US 2021/0291117 A1   Sep. 23, 2021

(30) Foreign Application Priority Data

Jul. 12, 2018 (GB) ..................... 1811436

(51) Int. Cl.
*B01D 63/08* (2006.01)
*B01D 53/22* (2006.01)
(Continued)

(52) U.S. Cl.
CPC ......... *B01D 63/082* (2013.01); *B01D 53/227* (2013.01); *B01D 53/228* (2013.01);
(Continued)

(58) Field of Classification Search
None
See application file for complete search history.

(56) References Cited

U.S. PATENT DOCUMENTS 2,824,620 A * 2/1958 De Rosset ........... B01D 63/082
95/56
2,958,391 A   11/1960 De Rosset
(Continued)

FOREIGN PATENT DOCUMENTS

EP    0783919 A1   7/1997
GB    1125110 A    8/1968
(Continued)

OTHER PUBLICATIONS

International Search Report and Written Opinion of the International Searching Authority issued in PCT/EP2019/068893, dated Nov. 7, 2019; ISA/EP.
(Continued)

*Primary Examiner* — Jason M Greene
(74) *Attorney, Agent, or Firm* — Harness, Dickey & Pierce, P.L.C.

(57) ABSTRACT

Disclosed herein is a gas separation section for separating a first gas from one or more other gasses in a separation device, the gas separation section comprising: a first membrane that is substantially planar; a second membrane that is substantially planar; a first substrate that has a first surface and a second surface, wherein the second surface of the first substrate is on an opposite side of the first substrate than the first surface of the first substrate; a second substrate that has a first surface and a second surface, wherein the second surface of the second substrate is on an opposite side of the second substrate than the first surface of the second substrate; and a mesh that is arranged between the second surface of the first substrate and the second surface of the second substrate; wherein: the first substrate and the second
(Continued)

substrate are sintered plates; the first membrane is on the first surface of the first substrate; the second membrane is on the first surface of the second substrate; the first and second membranes are both permeable by at least a first gas and not permeable by one or more other gasses; the thickness of the first membrane in a direction orthogonal to the plane of the first membrane is less than 10 micrometres; and the thickness of the second membrane in a direction orthogonal to the plane of the second membrane is less than 10 micrometres. Embodiments provide an improved gas separation device over known techniques. Advantages of the separation device according to embodiment include improved performance, easy implementation, a modular design and a scalable design.

15 Claims, 6 Drawing Sheets

(51) Int. Cl.
  *B01D 69/02* (2006.01)
  *B01D 71/02* (2006.01)
  *C01B 3/50* (2006.01)
(52) U.S. Cl.
  CPC .......... *B01D 69/02* (2013.01); *B01D 71/022* (2013.01); *C01B 3/505* (2013.01); *B01D 2053/222* (2013.01); *B01D 2256/16* (2013.01); *B01D 2257/502* (2013.01); *B01D 2257/504* (2013.01); *B01D 2313/04* (2013.01); *B01D 2313/14* (2013.01); *B01D 2313/20* (2013.01); *B01D 2313/26* (2013.01); *B01D 2325/04* (2013.01); *C01B 2203/0405* (2013.01); *C01B 2203/047* (2013.01); *C01B 2203/0475* (2013.01)

(56) References Cited

U.S. PATENT DOCUMENTS

| | | | | |
|---|---|---|---|---|
| 5,645,626 | A * | 7/1997 | Edlund | .......... B01D 63/08 95/56 |
| 6,494,937 | B1 * | 12/2002 | Edlund | .......... B01D 63/08 95/55 |
| 2001/0039759 | A1 | 11/2001 | Sato et al. | |
| 2010/0028703 | A1 | 2/2010 | Bredesen et al. | |
| 2012/0012004 | A1 | 1/2012 | Way et al. | |

FOREIGN PATENT DOCUMENTS

| | | |
|---|---|---|
| JP | H09248416 A | 9/1997 |
| JP | 2002128506 A | 5/2002 |
| JP | 2005503314 A | 2/2005 |
| JP | 2007-319743 A | 12/2007 |
| JP | 2008-246408 A | 10/2008 |
| JP | 2008-272605 A | 11/2008 |
| KR | 20030015216 A | 2/2003 |
| WO | WO-03026776 A1 | 4/2003 |
| WO | WO-2007-096128 A1 | 8/2007 |

OTHER PUBLICATIONS

Search Report Issued by the UKIPO for British Patent Application No. GB1811436.3 dated Jul. 26, 2018.
Japanese Office Action regarding Application No. 2021-524118, dated Apr. 4, 2022.
English translation of Korean Office Action regarding Application No. 10-2021-7004258 dated Jan. 12, 2023. English translation provided by JA Kemp LLP.

* cited by examiner

GAS SEPARATION DEVICE

CROSS REFERENCE TO RELATED APPLICATIONS

This application is a U.S. National Phase Application under 35 U.S.C. 371 of International Application No. PCT/EP2019/068893 filed on Jul. 12, 2019 which claims the benefit of priority from Great Britain Patent Application No. 1811436.3 filed on Jul. 12, 2018. The entire disclosures of all of the above applications are incorporated herein by reference.

The present invention relates to the separation of gases by membranes. Embodiments provide a separation device that is particularly appropriate for the separation of hydrogen from syngas. Advantages of the separation device according to embodiments include improved performance over known separation devices, easy implementation, a modular design and a scalable design.

BACKGROUND

Hydrogen is increasingly being used as an energy source. An advantage of hydrogen is that it combusts to produce water and it is therefore a clean fuel. Applications in which hydrogen may be used as a combusted fuel include the powering of ships and as a domestic gas supply. Hydrogen may also be used in fuel cells that are an environmentally friendly alternative to conventional batteries.

An efficient form of hydrogen production is from syngas. Syngas may be produced by reforming natural gas. Syngas is a gas mixture that mostly comprises carbon monoxide and hydrogen. Syngas may also comprise amounts of carbon dioxide and other gasses, such as methane. A water gas shift reaction may also be performed on the syngas in order to increase the concentration of hydrogen in the gas mixture. To produce substantially pure hydrogen, it is necessary to separate the hydrogen from the other gasses in the gas mixture.

A known technique for separating hydrogen from other gasses is the use of a palladium alloy membrane. A gas mixture is passed through a pipe with the membrane as the pipe walls. The hydrogen diffuses through the membrane and is thereby separated from the other gasses in the gas mixture that are unable to pass through the membrane.

In known hydrogen separators, the membrane thickness is typically in the order of 100 micrometres. The rate at which hydrogen can pass through the membrane is inversely proportional to the membrane thickness and proportional to the membrane surface area. The separation of hydrogen by such membranes is slow due to the large membrane thickness. In addition, the implementation costs are high because palladium is expensive.

There is a general need to improve known gas cleaning and/or separation devices.

SUMMARY

According to a first aspect of the invention, there is provided a gas separation section for separating a first gas from one or more other gasses in a separation device, the gas separation section comprising: a first membrane that is substantially planar; a second membrane that is substantially planar; a first substrate that has a first surface and a second surface, wherein the second surface of the first substrate is on an opposite side of the first substrate than the first surface of the first substrate; a second substrate that has a first surface and a second surface, wherein the second surface of the second substrate is on an opposite side of the second substrate than the first surface of the second substrate; and a mesh that is arranged between the second surface of the first substrate and the second surface of the second substrate; wherein: the first membrane is on the first surface of the first substrate; the second membrane is on the first surface of the second substrate; the first and second membranes are both permeable by at least a first gas and not permeable by one or more other gasses; the thickness of the first membrane in a direction orthogonal to the plane of the first membrane is less than 10 micrometres; and the thickness of the second membrane in a direction orthogonal to the plane of the second membrane is less than 10 micrometres.

Preferably, the first gas is hydrogen and the one or more other gasses include carbon monoxide and/or carbon dioxide.

Preferably, the first and second membranes comprise palladium; and, optionally, the first and second membranes further comprise one or more other metals than palladium.

Preferably, the first and/or second membrane comprises silver; and, preferably, the membrane is between 15 wt % to 40 wt % silver with the rest of the membrane being palladium; and, more preferably, the membrane is 77 wt % palladium and 23 wt % silver.

Preferably, said thickness of the first and/or second membrane is between 0.2 and 4 micrometres, preferably between 1 and 3 micrometres.

Preferably, the first and second membranes are substantially square shaped.

Preferably, the mesh is a steel mesh.

Preferably: the mesh is attached to the second surface of the first substrate at a plurality of locations between opposite edges of the second surface of the first substrate; and the mesh is attached to the second surface of the second substrate at a plurality of locations between opposite edges of the second surface of the second substrate.

Preferably, the mesh is arranged to maintain the second surface of the first substrate substantially parallel to the second surface of the second substrate.

Preferably, the mesh is arranged to maintain the second surface of the first substrate separated from the second surface of the second substrate by a distance in the range 2 mm to 30 mm.

Preferably, the first and/or second substrates comprise any of a sintered plate, metal, ceramics, polymer or combinations thereof.

Preferably, said thickness of the first and/or second substrate is less than 3 mm.

Preferably, the gas separation device further comprises: a first gasket that is arranged to provide a gas seal at the edges of the first membrane; and a second gasket that is arranged to provide a gas seal at the edges of the second membrane.

Preferably, the mesh is arranged in a channel that, in use, the first gas is arranged to flow through.

Preferably, the gas separation device further comprises a frame that is arranged to contain a flow path of the first gas; wherein the frame arranged to be in fluid communication with the channel such that, in use, the first gas flows from the channel into the frame.

Preferably, the frame comprises a substantially annular section that encircles the first and second membranes.

Preferably: the first gasket is a single piece structure that comprises a substantially square section within a substantially annular section; and/or the second gasket is a single piece structure that comprises a substantially square section within a substantially annular section.

According to a second aspect of the invention, there is provided a separation device for separating a first gas from one or more other gasses, the separation device comprising: an inlet for receiving a gas mixture comprising a first gas and one or more other gasses; a plurality of gas separation sections according to the first aspect of the invention, wherein the plurality of gas separation sections are arranged in a stack; a first outlet arranged to output the first gas that has passed through one or more of the membranes in the one or more gas separation sections; and a second outlet arranged to output at least the one or more other gasses that have not passed through one or more of the membranes in the one or more gas separation sections.

Preferably, the plurality of gas separation sections are arranged in a vertical stack.

Preferably, the separation device further comprises an outer housing; and the plurality of gas separation sections are arranged within the outer housing.

Preferably, the outer housing is substantially cylindrical.

Preferably, the first inlet is provided in either an upper or a lower section of the housing, such that, in use, the direction of flow of the gas mixture into the housing is substantially orthogonal to the planes of the membranes in the gas separation sections.

Preferably, the housing further comprises an inlet that is arranged to receive steam for heating the gas separation sections.

Preferably, the housing further comprises an inlet for purge gas that is supplied to one or more channels that the first gas that has passed through a membrane is arranged to flow through.

According to a third aspect of the invention, there is provided a method of separating a first gas from a gas mixture comprising the first gas and one or more other gasses, the method comprising: feeding the gas mixture into a separation device according to the second aspect of the invention; receiving first a gas flow from the separation device that comprises substantially only the first gas; and receiving a second gas flow from the separation device that comprises at least the one or more other gasses than the first gas.

EMBODIMENTS

Embodiments provide an improved gas separation device over known techniques. Advantages of the separation device according to embodiments include improved performance, easy implementation, a modular design and a scalable design.

Figure 1:
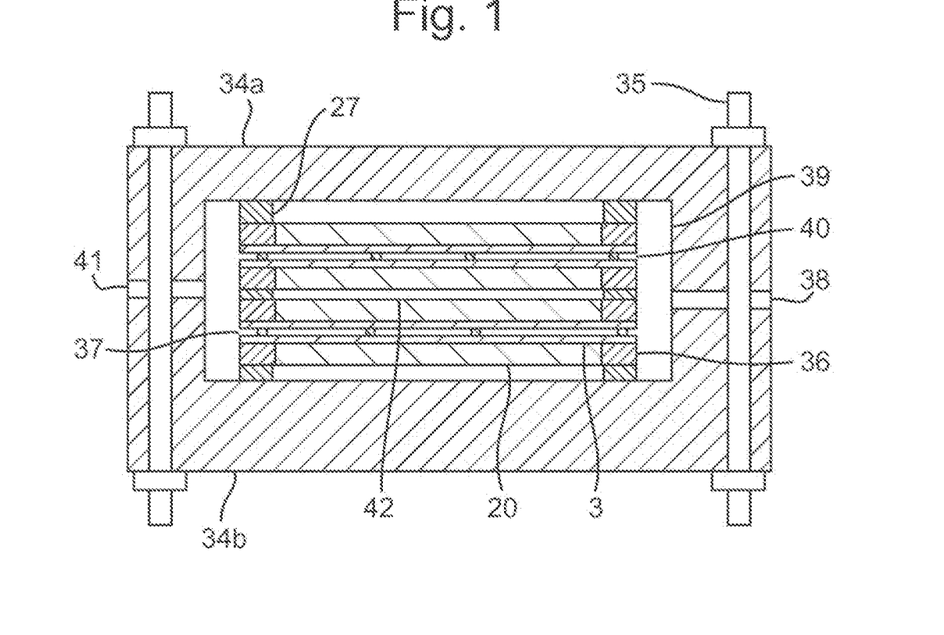
FIG. 1 shows a known implementation of an apparatus for separating hydrogen from other gasses.

FIG. 1 shows a known implementation of an apparatus for separating hydrogen from other gasses. The apparatus shown in FIG. 1 is disclosed in FIG. 6 of U.S. Pat. No. 8,163,064 B2. An important advantage of the apparatus shown in FIG. 1 over other known hydrogen separation techniques is that the thickness of the palladium membrane is reduced to less than 10 micrometres. The reduced thickness of the membrane both increases hydrogen flow through the membrane and reduces costs.

Embodiments provide a hydrogen separation device that improves on the apparatus shown in FIG. 1.

Figure 6A:
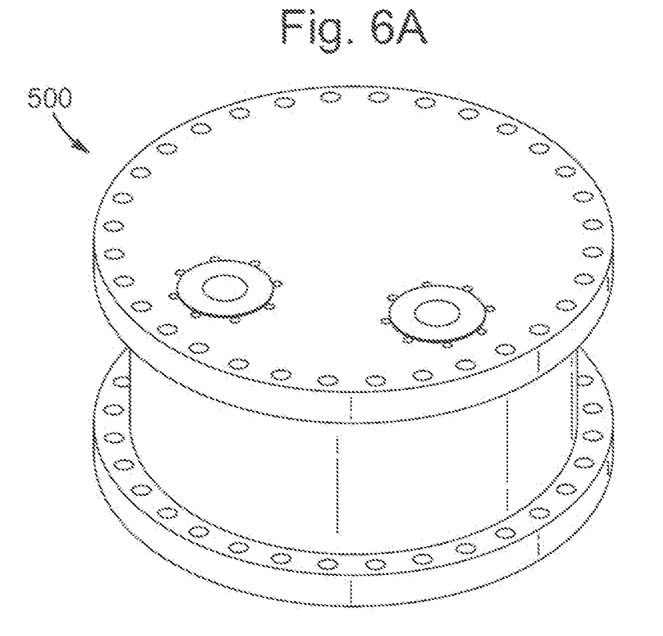
FIG. 6A shows a separation device according to an embodiment.
Figure 6B:
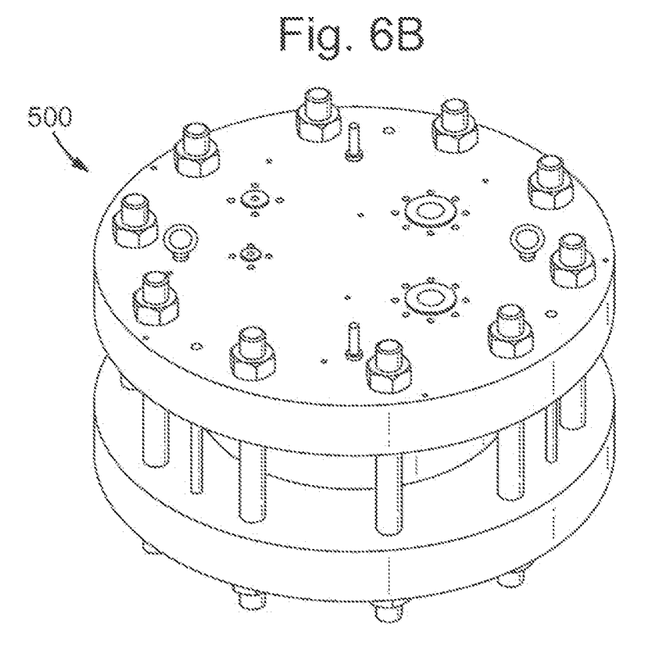
FIG. 6B shows a separation device according to an embodiment.

FIGS. 6A and 6B show a separation device 500 according to embodiments.

Figure 2:
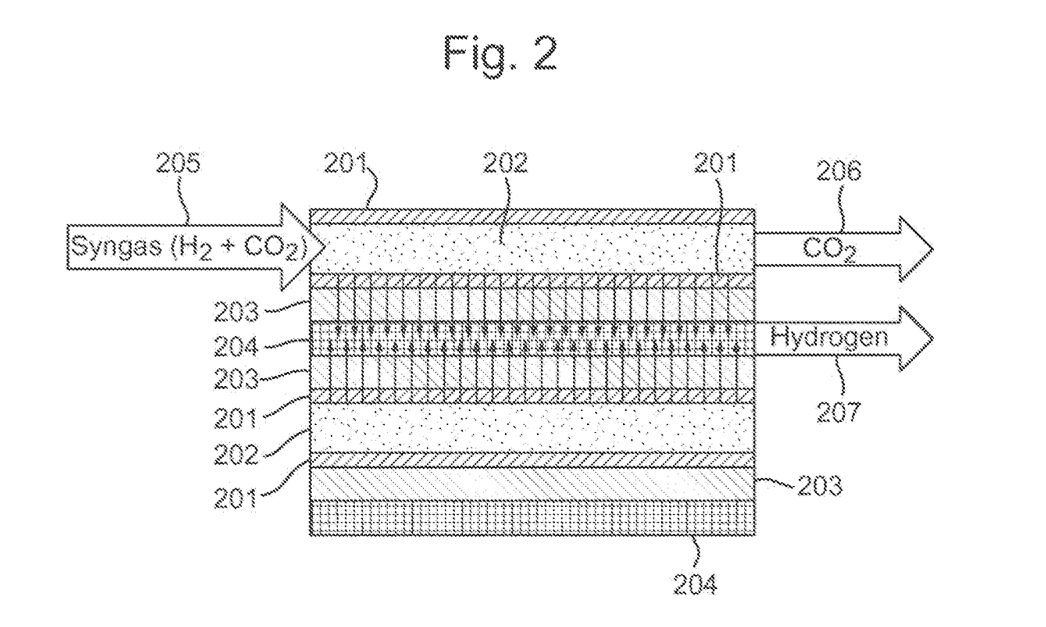
FIG. 2 is a cross-section of components of part of a separation device according to an embodiment.

FIG. 2 is a cross-section of components of part of a separation device 500 according to an embodiment. The separation device 500 is described in the example application of hydrogen separation from syngas. A water gas shift reaction may have been performed on the syngas and so the reference to syngas is to be understood as being any gas mixture comprising hydrogen and one or more of carbon monoxide, carbon dioxide, steam and other gasses, such as methane. As shown by the text in the large arrows in FIG. 2, embodiments include the input gas mixture being substantially a mixture of only carbon dioxide and hydrogen. A first output may be a stream of substantially only carbon dioxide. A second output, that is separate from the first output, may be a stream of substantially only hydrogen.

The separation device 500 comprises a plurality of first channels 202 and a plurality of second channels 204. Each of the first channels 202 are formed between planar membranes 201 that are walls of the first channel 202. Each planar membrane 201 is formed on a substrate 203 that supports the membrane 201. Each substrate 203 is formed on a steel mesh on the other side of the substrate 203 from the membrane 201. The mesh is provided within each of a plurality of second channels 204. Hydrogen is able to pass through the membrane 201, pass through the substrate 203 and flow along each second channel 204, as the mesh structure comprises gas flow paths for the hydrogen.

The gas input to each of the first channels 202 is syngas. The gas that is output from each of the first channels 202 the referred to herein as a retentate gas. Retentate gas is the remaining contents of the input syngas into a first channel 202 after some, or all, of the hydrogen in the input syngas gas has passed through a membrane 201. The output gas from a second channel 204 comprises hydrogen that has passed through a membrane 201.

Each first channel 202 has an inlet 205 for syngas at one end of the channel and an outlet 206 for retentate at the other end of the first channel 202.

At least one end of each second channel 204 is an outlet 207 for hydrogen. Embodiments also include more than one end of the second channel 204 being an outlet for hydrogen.

In use, syngas is provided at the inlet of one or more of the first channels 202 and passes through each of these first channels 202 towards the respective outlets of the first channels 202. As the syngas passes through each first channel 202, hydrogen in the syngas passes through the planar membrane 201 walls of the channel. The retentate gas that passes through the outlet of each first channel 202 has a lower concentration of hydrogen than the syngas gas at the inlet of the first channel 202 due to the hydrogen passing through the membrane 201. Preferably, substantially no hydrogen is present in the gas that passes through the outlet of each first channel 202. The hydrogen that passes through the membrane 201 passes through the substrate 203, into one of the second channels 204 and out of an outlet 207 of the second channel 204.

Figure 3A:
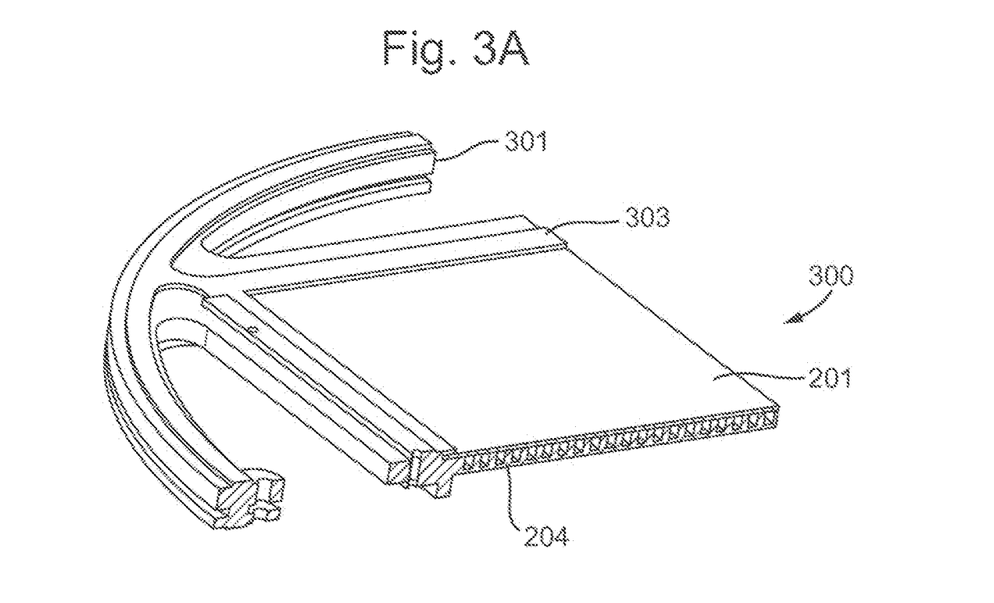
FIG. 3A shows part of an implementation of a single gas separation section according to an embodiment.
Figure 3B:
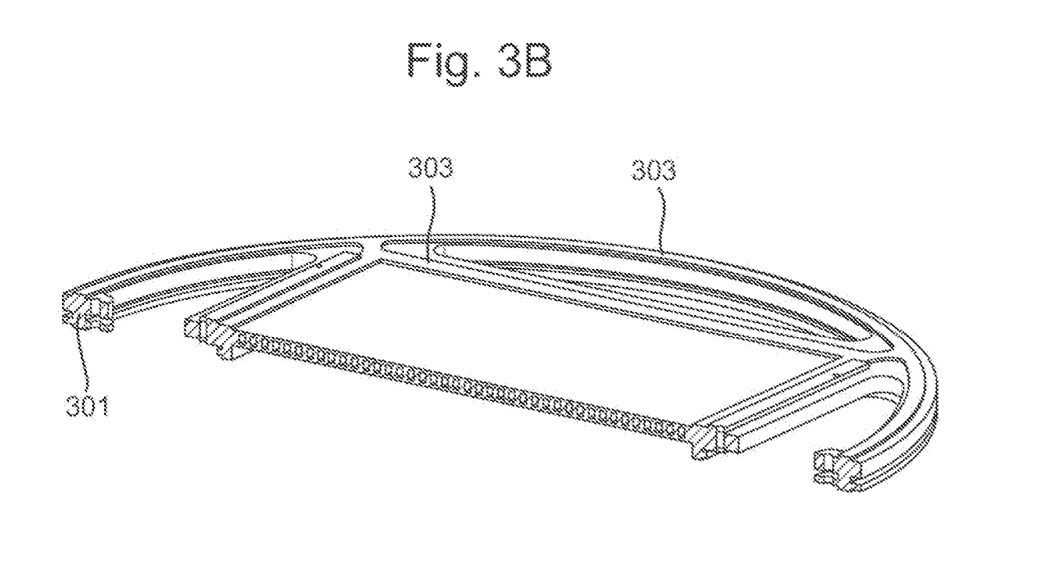
FIG. 3B shows part of an implementation of a single gas separation section according to an embodiment.
Figure 3C:
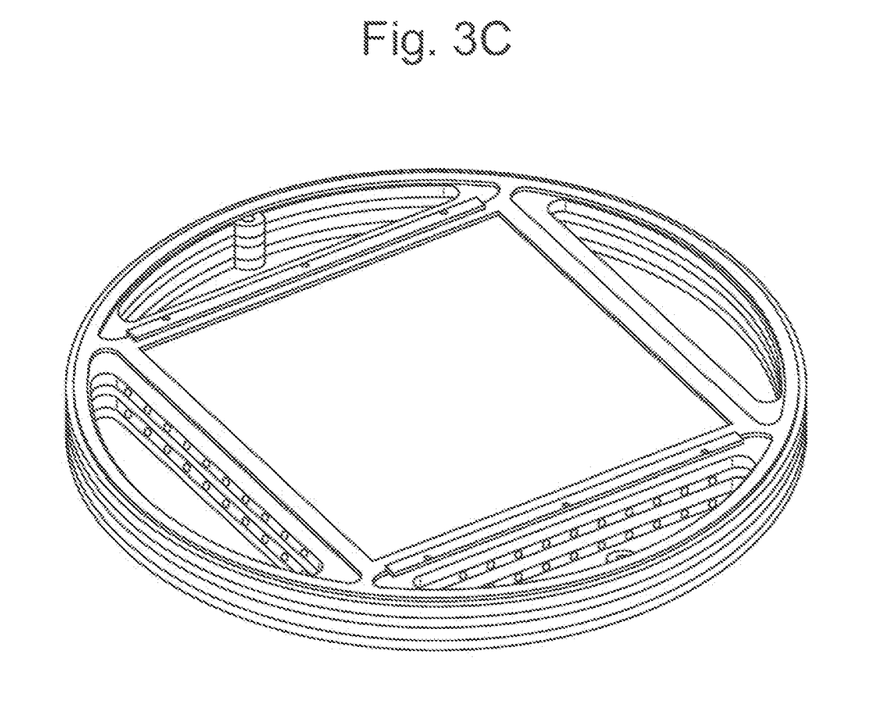
FIG. 3C shows two gas separation sections, with one stacked on top of the other, according to an embodiment.
Figure 4A:
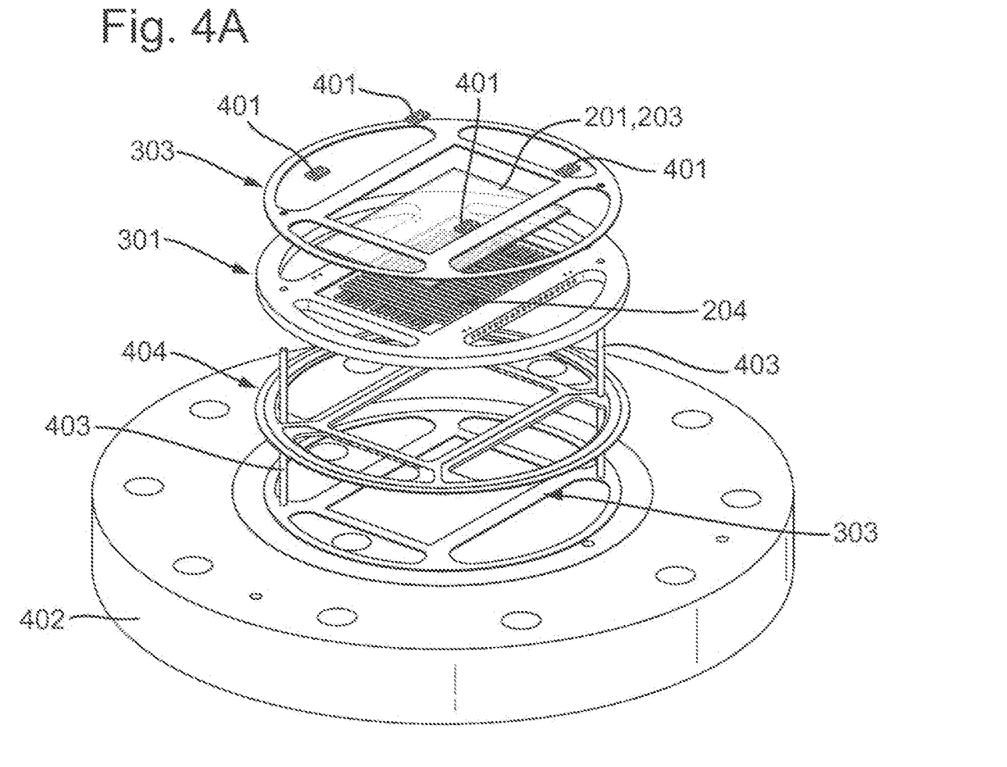
FIG. 4A shows the components of a gas separation device and a base according to an embodiment.
Figure 4B:
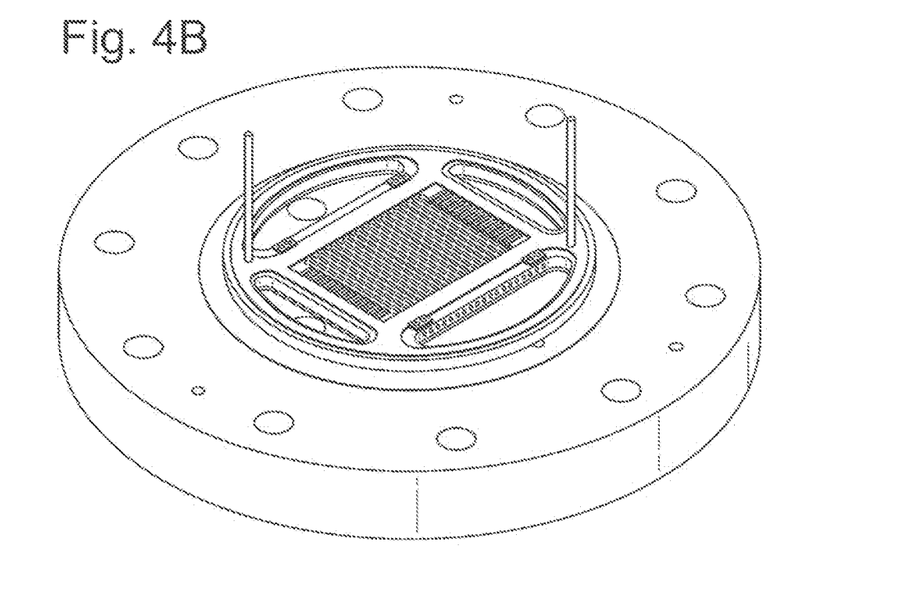
FIG. 4B shows the components of a gas separation device provided on a base according to an embodiment.

FIGS. 3A and 3B show part of an implementation of a single gas separation section 300 of a separation device 500 according to an embodiment. FIG. 3C shows two gas separation sections 300 with one stacked on top of the other. FIG. 4A shows the components of a gas separation section 300 together with a base 402 that the gas separation section 300 is provided on according to an embodiment. FIG. 4B shows the gas separation section 300 in FIG. 4A when formed and provided on the base 402. When the separation device 500 is orientated so that each of the membranes 201 is horizontal, the base 402 may be either an upper section or a lower section of the gas separation device 500.

Figure 5:
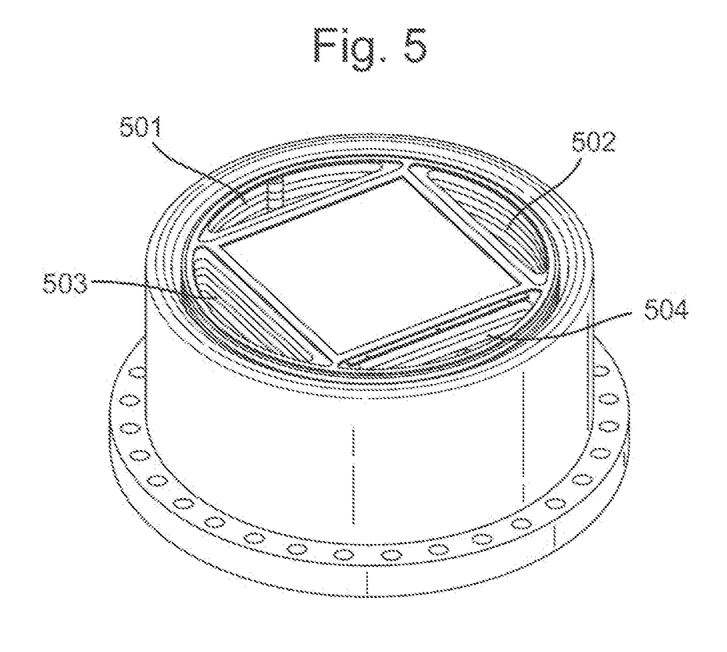
FIG. 5 shows a cross section through a separation device according to an embodiment.

The separation device 500 according to embodiments preferably comprises a plurality of gas separation sections 300, as shown in at least FIGS. 3C and 5.

Gas separation sections 300, as shown in FIGS. 3A, 3B, 4A and 4B, provide the parts of the structure as described earlier with reference to FIG. 2. Each gas separation section 300 comprises two planar membranes 201 with each planar membrane 201 provided on a side of a substrate 203. The other side of each substrate 203 is connected to a steel mesh. The mesh defines a second channel 204 between the membranes 201 for collecting hydrogen.

As shown in at least FIGS. 3C, 4B and 5, each gas separation section 300 is a substantially planar structure that comprises a substantially annular part as well as a substantially square part. The membranes 201 are provided in the substantially square part of each gas separation section 300. Each gas separation section 300 has one or more connecting sections between the substantially square part and the substantially annular part. For example, a connecting section may be provided at each of the four corners of the square part, as shown in at least FIGS. 3C and 4B.

As shown in at least FIGS. 3C, 4B and 5, there is a segment shaped hole between each outer edge of the substantially square part of each gas separation section 300 and the inner edge of the substantially annular part of each gas separation section 300. Each gas separation section 300 comprises four separate segment shaped holes, with each of the segment shaped holes having substantially the shape of a segment of a circle.

Each gas separation section 300 comprises a hydrogen frame 301. The hydrogen frame 301 provides a structural support for a mesh. The mesh supports a substrate 203 and the substrate 203 supports a membrane 201.

Each hydrogen frame 301 is a substantially planar structure that comprises a substantially annular part as well as a substantially square part. Between each outer edge of the substantially square part of each hydrogen frame 301 and the inner edge of the substantially annular part of the hydrogen frame 301 is a segment shaped hole, the hydrogen frame 301 comprising four such segment shaped holes. There are circular holes through opposing side walls of the substantially square part of each hydrogen frame 301 such that each hydrogen frame 301 provides a flow path of hydrogen out of a second channel 204 that is formed within the substantially square part of the hydrogen frame 301. The direction of the flow path of hydrogen through the circular holes of the side walls of the substantially square part of the hydrogen frame 301 is parallel to the plane of the hydrogen frame 301. In use, hydrogen within the second channel 204 is therefore able to flow out of the second channel 204 and into at least one of the segment shaped holes of the hydrogen frame 301.

As shown in at least FIG. 4A, each gas separation section 300 also comprises a syngas frame 404. Each syngas frame 404 is a substantially planar structure that comprises a substantially annular part as well as a substantially square part. Between each outer edge of the substantially square part of each syngas frame 404 and the inner edge of the substantially annular part of the syngas frame 404 is a segment shaped hole, the syngas frame 404 comprising four such segment shaped holes. There are circular holes through opposing side walls of the substantially square part of each syngas frame 404 such that each syngas frame 404 provides a flow path of the syngas into a first channel 202 and the retentate gas, i.e. syngas without the hydrogen that has flowed through a membrane 201, out of the first channel 202. The direction of the flow path of syngas and retentate gas through the circular holes of the side walls of the substantially square part of the syngas frame 404 is parallel to the plane of the syngas frame 404. The first channel 202 is formed between two adjacent gas separation sections 300 that are in a stacked arrangement, as shown in at least FIG. 3C. When three or more gas separation sections 300 are in a stacked arrangement, two or more first channels 202 are formed, as shown in, and described with reference to, FIG. 2. Each first channel 202 is formed between the substantially square parts of two syngas frames 404. In use, retentate gas within each first channel 202 is therefore able to flow out of the first channel 202 and into at least one of the segment shaped holes of a syngas frame 404.

The syngas frames 404 and hydrogen frames 301 have a similar shape to each other. Each segment shaped hole of each syngas frame 404 has substantially the same shape as, and is aligned with, a segment shaped hole of a hydrogen frame 301. Each segment shaped hole of each gas separation section 300 therefore comprises the segment shaped hole of at least one hydrogen frame 301 and the segment shaped hole of at least one syngas frame 404. Both the hydrogen frame 301 and the syngas frame 404 comprise circular holes, in an opposing pair of the side walls of their substantially square parts, for providing gas flow paths. The hydrogen frame 301 and a syngas frame 404 within a gas separation section 300 are positioned such that the pair of opposing walls of the hydrogen frame 301 that comprise the circular holes are not aligned with the pair of opposing walls of the syngas frame 404 that comprise circular holes. The direction of the gas flow path provided by the circular holes of the hydrogen frame 301 is therefore orthogonal to the direction of the gas flow path provided by the circular holes of the syngas frame 404. When a plurality of gas separation sections are stacked on top of each other, all of the hydrogen frames 301 and the syngas frames 404 of the gas separation sections are aligned with each other such that the directions of the gas flow paths provided by the circular holes of all of the hydrogen frames 301 are the same and the directions of the gas flow paths provided by the circular holes of all of the syngas frames 404 are the same.

The segment shaped holes in each gas separation section 300 are not in direct fluid communication with each other. Gas in one of the segment shaped holes can only flow into a different one of the segment shaped holes by flowing through a first channel 202 or a second channel 204.

As shown in FIGS. 3A, 3B, 4A and 4B, gaskets 303 are provided. Gaskets 303 are gas seals. A gasket 303 is provided that covers all of the edges of each membrane 201 so that gas in the first channel 202 is prevented from flowing around the ends of the membrane 201 into the second channel 204, and vice versa. The only gas flow between the first channel 202 and second channel 204 is therefore gas that has passed through the membrane 201, and not around the edges of the membrane 201. Each gasket 303 is preferably a single structure that provides a gas seal around all of the edges of the membrane 201. Each gasket 303 is preferably integral with the upper, or lower, section of a hydrogen frame 301.

Between adjacent gas separation sections 300 a gas tight seal, e.g. a polymeric/rubber seal, may be provided for preventing any undesired gas flow paths.

As shown in at least FIG. 4A, each gas separation section 300 may be formed by positioning different components of the gas separation section 300 on each other. A gas separation section 300 may be formed on a base 402 that comprises a flange. A first gasket 303, that may have substantially the same shape as each hydrogen frame 301 and syngas frame 404, may be positioned directly on the base 402. A syngas frame 404 may be positioned on the first gasket. A hydrogen frame 301 may be positioned on the syngas frame 404. The hydrogen frame 301 supports a steel mesh. The mesh supports two substrates 203 and each substrate supports a membrane 201. In FIG. 4A, an upper substrate 203 and membrane 201 is shown. A lower substrate 203 and membrane 201 is also present, however this is not visible in FIG. 4A. Although not shown in FIG. 4A, another gasket, with a similar shape to the first gasket, may be provided between the syngas frame 404 and the hydrogen frame 301. One or more guide pins 403 may be provided for aiding the alignment of each of the components of all of the gas separation sections 300.

A first implementation of a gas separation section 300 according to an embodiment is shown in FIGS. 3A, 3B and 3C. A second implementation of a gas separation section 300 according to an embodiment is shown in FIGS. 4A and 4B.

As shown in at least FIG. 3C, in the first implementation a gasket is attached to a hydrogen frame 301 by at least one, and preferably two, cuboid bar shaped member. Each cuboid shaped bar member substantially extends along the entire length of an edge of the substantially square shaped part of the hydrogen frame 301. As shown in at least FIGS. 4A and 4B, the second implementation differs from the first implementation by the gasket being attached to a hydrogen frame 301 by at least one short gasket retainer. Preferably, there are four gasket retainers as shown on at least FIG. 4B. Each gasket retainer may be screwed to the hydrogen frame 301.

As shown in at least FIG. 5, when a plurality of gas separation sections 300 are arranged in a stack, the segment shaped holes of each gas separation section 300 are aligned with each other such that gas in the segment shaped hole of each gas separation section 300 can flow directly into a corresponding segment shaped hole of at least one other adjacent gas separation section 300. Due to the alignment of the gas separation sections 300, gas is prevented from directly flowing from a segment shaped hole of a gas separation section 300 into more than one segment shaped hole of an adjacent gas separation section 300.

The segment shaped holes of the plurality of gas separation sections 300 align to form four inlet/outlet channels 501, 502, 503, 504 through the stack of gas separation sections 300. Each inlet/outlet channel 501, 502, 503, 504 may be in fluid communication with at least one input or output port of the separation device 500. The inlet/outlet channels may therefore provide flow paths for the input syngas, the output hydrogen and the output retentate gas. Although not shown in FIG. 5, each of the gas separation sections 300 in FIG. 5 has the above-described circular holes in its hydrogen frame 301 and its syngas frame 404. All of the gas separation sections are aligned such that each channel 501, 502, 503, 504 is a parallel arrangement of the same gas inlet/outlet of substantially identical gas separation sections.

For example, channel 502 may be an inlet channel that provides a flow path of syngas from an input port for syngas. The syngas may flow into and along channel 502, in a direction that is orthogonal to the plane of each gas separation section 300, and into any of the gas separation sections 300. All of the inlets of syngas into the first channels 202 of the plurality of gas separation sections 300 are in parallel with each other.

Channel 503 may be an outlet channel that provides a flow path of the retentate gas to an output port for retentate gas. The retentate gas flows out of each first channel 202 into channel 503 and then, in a direction that is orthogonal to the plane of each gas separation section 300, along channel 503 to an output port. All of the outlets of retentate gas from the first channels 202 of the plurality of gas separation sections 300 are in parallel with each other.

One, or both, of channels 501 and 504 may be outlet channels of hydrogen that provide flow paths of hydrogen to one or more outputs for hydrogen. The hydrogen may flow out of each second channel 204 into at least one, or both, of channels 501 and 504, and then, in a direction that is orthogonal to the plane of each gas separation section 300, along one, or both, of channels 501 and 504 to at least one output port for hydrogen. All of the outlets of hydrogen from the second channels 204 of the plurality of gas separation sections 300 are in parallel with each other.

In an alternative embodiment, channel 501 provides an outlet channel of hydrogen and channel 504 provides an inlet channel of purge gas. The purge gas flows into each second channel 204. The purge gas increases the rate at which hydrogen that has passed through the membrane 201 flows out of a second channel 204 into a hydrogen frame 301. This reduces the partial pressure of the hydrogen in the second channel 204 and therefore increases the rate at which hydrogen travels from the first channel 202 into the second channel 204 via the membrane 201.

FIGS. 5, 6A and 6B show a separation device 500 according to an embodiment. FIG. 5 is a cross section through the separation device 500 according to an embodiment.

As shown in FIGS. 6A and 6B, the separation device 500 comprises an annular outer chamber, a circular upper section and a circular lower section. The upper section and/or the lower section may be bases 402 for a gas separation section 300. As shown in FIG. 5, the separation device 500 comprises a plurality of gas separation sections 300 in a stacked configuration. The plurality of gas separation sections 300 may be vertically stacked so that each plane of a membrane 201 is horizontal. As shown in FIG. 6B, the upper section and lower section may be bolted together by bolts that pass through flanges of both the upper section and the lower section.

Provided in one, or both, ends of the separation device 500, that may be an upper or lower section of the separation device 500, are at least one input port for syngas and at least one output port for retentate.

Provided in one, or both, ends of the separation device 500, that may be an upper or lower section of the separation device 500, are one or more output ports for hydrogen and/or a mixture of hydrogen and purge gas. There may be at least one input port in the separation device 500 for a purge gas in an upper and/or lower section of the separation device 500.

There may also be one or more input and/or output ports in the separation device 500 for other gasses, in particular for steam. The one or more input and/or output ports for steam may be in an upper and/or lower section of the separation device 500. Steam is preferably fed into the separation device 500 in order to heat the membranes 201. Alternatively, or in addition, the separation device 500 may be heated in other ways, such as electrically.

The outer housing of the separation device 500 advantageously allows the separation of the hydrogen and syngas to be performed in a heated and pressurised environment. The presence of a cylindrical outer housing also increases the safety of the system.

The membrane 201 according to embodiments is less than 10 micrometres thick. That is to say, in a distance orthogonal to the plane of the membrane 201, the planar surfaces of the membrane 201 are less than 10 micrometres apart from each other.

The membrane 201 is preferably between 1 and 4 micrometres thick, more preferably between 2 and 3 micrometres thick.

The membrane 201 according to embodiments may be the same as, and manufactured in the same way as, the membranes disclosed in U.S. Pat. No. 8,163,064 B2 and/or U.S. Pat. No. 6,086,729.

The composition of the membrane 201 may be substantially only palladium. Alternatively, the membrane 201 may comprise palladium and one or more other metals than palladium.

The composition of the membrane 201 is preferably such that between 15% and 40% of its weight is silver with the rest of the weight being palladium. Preferably, the composition of the membrane 201 is such that between a fifth and a third of its weight is silver with the rest of the weight being palladium. More preferably, the composition of the membrane 201 is such that 77% of its weight is palladium and 23% of its weight is silver.

The membrane 201 may comprise palladium, silver and metal X and/or metal Y, where metal X is different from metal Y, and metal X and metal Y are both other metals than palladium and silver.

The membrane 201 is preferably square, with the length of each side of the square being about 500 mm.

The substrate 203 according to embodiments has the property that hydrogen can pass through it. The substrate 203 may be either a porous material or a material that is penetrable by hydrogen due to solid phase diffusion (e.g. mixed conductors of electronic and oxygen ion conducting and/or proton conducting cerams or metals of the IVB and VB groups) or layered combinations thereof. The substrate 203 may be made from metal, ceramic, polymer, or combinations thereof.

In a particularly preferred embodiment, the substrate 203 is a sintered plate. The sintered plate may be manufactured from steel, preferably AISI316L. A sintered plate is a particularly preferred substrate for a thin membrane 201, such as the membranes disclosed in U.S. Pat. No. 8,163,064 B2 and/or U.S. Pat. No. 6,086,729.

The membrane 201 is preferably provided directly on the substrate 203. That is to say, there is no further layer of material provided between the membrane 201 and the substrate 203. This minimises the transportation distance, and transportation resistance, of hydrogen between the first channel 202 and the second channel 204.

The substrate 203 may be between 0.5 mm and 5 mm thick, preferably between 1 mm and 3 mm thick.

The planar surfaces of the substrate 203 should be at least the same size as the planar membrane 201 that it supports, and are preferably substantially the same size as the membrane 201. The substrate 203 therefore preferably has square planar surfaces, with the length of each side of the square being 500 mm.

The number of gas separation sections 300 in the separation device 500 is variable and may be in the range 2 to 500, preferably 25 to 200.

The separation device 500 preferably is designed to operate at pressures of at least 50 barg.

The separation device 500 preferably is designed to operate at temperatures of at least 450° C.

The separation device 500 preferably has a typical operational temperature in the range 300° C. to 400° C.

The outer diameter of each gas separation section 300 may be in the range 710 mm to 1000 mm.

The outer diameter of the housing may be in the range 750 mm to 1200 mm.

The height of the housing may be in the range 350 mm to 5000 mm.

The height of the upper and/or lower section of the housing may be in the range 50 mm to 200 mm.

The mesh may be shaped so as to maintain the substrates 203 that it is attached to parallel to each other and spaced apart by a distance in the range 1 mm to 100 mm, preferably in the range 2 mm to 30 mm.

The flow rate of syngas into the separation device 500 may be 10 000 Nm$^3$/h.

The above-provided dimensions of the components of the separation device 500 are approximate and embodiments also include variations to these dimensions. For example, the shapes of components may be varied so as to accommodate instrumentation into the separation device 500. The separation device 500 may also be made in a range of sizes so that the it is appropriate for both small and large scale applications.

The separation device 500 according to embodiments is advantageously easy to implement and suitable for large scale hydrogen separation from syngas.

The rate at which hydrogen can be separated from syngas by a separation device 500 according to embodiments can be easily changed by increasing, or reducing, the number of gas separation sections 300 within the outer housing.

The separation device 500 is also easily scalable. The rate at which hydrogen can be separated from syngas can be increased by increasing the height of the outer housing so that it may comprise a larger number of gas separation sections 300.

The separation device 500 also has a modular design. Any of the gas separation sections 300 within the separation device 500 can be easily accessed and replaced if a fault has occurred or for inspection/maintenance.

The input and output ports are preferably also orientated perpendicular to the main flow paths through each of the first and second channels 204 through the separation device 500. The inputs and outputs of each first channel 202 are therefore in parallel with each other. The variation of the amount of syngas that flows into each first channel 202 is therefore small. Advantageously, a complicated electronically controlled manifold system is not required for ensuring that the flow rate of syngas into each of the first channels 202 is appropriate. The flow rate of syngas into each of the first channel 202 also remains appropriate when the number of gas separation sections 300 is changed.

The parallel inputs of syngas to each first channel 202 is advantageously over providing a flow path so that all of the first channels in series with each other. When the inputs of first channels 202 are in parallel, the concentration of hydrogen in the syngas is the same for each first channel 202. When the first channels are in series with each other, the concentration of hydrogen in the syngas is different for each first channel.

Another advantage of the gas separation sections 300 according to embodiments is the use of a mesh. The mesh in each gas separation section 300 provides the main structural support for the substrates 203 and membranes 201. The mesh therefore allows use of thin substrates 203 as each substrate 203 needs only be thick enough to support a membrane 201 and to be attachable to the mesh. It is not necessary for the substrates 203 to be thick enough to provide the structural support of the second channel 204 through a gas separation section 300. Reducing the thickness of the substrates 203 both reduces the required spacing between membranes 201 and reduces the manufacturing cost.

The outer housing of the separation device 500 advantageously allows all of pressurised operation, the use of steam and increases safety.

The apparatus as shown in FIG. 1 has a number of fundamental design differences from separation devices 500 according to embodiments. A consequence of these differences is that the membrane module as shown in FIG. 1 is not easy to implement and is not suitable for large scale hydrogen separation from syngas.

In FIG. 1, there is no mesh connecting substrates. Each substrate therefore needs to be strong enough to structurally support channels through the membrane module. As a consequence, the substrates need to be thick and this increases the size and cost of the membrane module.

In addition, spacers are required between the membranes for maintaining the separation between the membranes. Providing spacers on the membrane as shown in FIG. 1 increases the likelihood of the membrane being damaged. The spacers also impede the flow of syngas between the membranes.

The membrane module shown in FIG. 1 does not comprise a gasket 303 at the edge of the membrane. There would therefore be a risk of gas leakage at the ends of the membrane.

The membrane module shown in FIG. 1 does not comprise an outer housing. It is therefore not possible to pressurise and heat the membranes.

The membrane module shown in FIG. 1 is not scalable. The input and output ports of the syngas are provided in the same plane as the membranes and at the vertical mid-point of the structure. If the number of membranes is increased to above two, the flow of syngas will not be equally distributed amongst the membranes.

In addition, in FIG. 1 the input flow of syngas is directly onto the membrane structures. If the flow rate of the syngas is increased, the increased flow may damage the membrane structures that the syngas flows onto.

The membrane module shown in FIG. 1 does not have a modular design. The number of membranes cannot be changed and the membranes cannot be easily replaced.

The separation device 500 according to embodiments also has a number of advantages over other types of known separation devices from that shown in FIG. 1. In particular, the membrane 201 according to embodiments is thin. The membrane 201 is preferably less than 10 micrometres thick, more preferably between 1 and 5 micrometres thick. Other types of known separation devices from that shown in FIG. 1 have thicker membranes. The rate of flow of hydrogen through each membrane is therefore lower and the costs are increased.

The separation device 500 according to the above-described embodiments also has a number of advantages over a separation device with a tubular membrane instead of a planar membrane. The transportation distance of the hydrogen within the syngas is dependent on average spacing between adjacent membranes. With planar membranes, adjacent membranes are parallel to each other and so the average spacing between adjacent membranes is the minimum distance between the adjacent membranes. When tubular membranes are used, the membranes are not parallel to each other and the average spacing between adjacent membranes is greater than the minimum distance between adjacent membranes. The transportation distance of the hydrogen is therefore lower when planar membranes are used.

In embodiments, hydrogen is collected in at least one outlet channel 501 and 504 between an edge of the substantially square part of each gas separation section 300 and the substantially annular part of each gas separation section 300. The outlet channel provides a flow path of hydrogen to an output port. Advantageously, the provision of a flow path for the hydrogen allows the membrane to have a regular shape, for example the membrane may be a solid square. This is advantageous over providing a hydrogen flow path that requires making a hole in the plane of a membrane. In particular, this is advantageous over using annular membranes with a flow path for collected hydrogen through the middle of each annular membrane. Such an implementation would reduce the available membrane size. There would also be substantial pressure differences within the system.

Embodiments include a number of modifications and variations to the techniques as described above.

Embodiments have been described with reference to hydrogen being separated from the other constituents of syngas. Embodiments also include other applications. For example, hydrogen may be separated from other gas mixtures, such as hydrogen removal during the reaction of alkenes to alkynes and purification of hydrogen.

Embodiments include the use of other membranes than palladium membranes. The use of other membranes allows other gasses than hydrogen to be separated from a gas mixture.

The separation device 500 according to embodiments can therefore be used to separate any of one or more gasses that can flow through the membranes from a gas mixture.

Embodiments have been described as a gas separation device 500. Embodiments may also be considered to be a gas cleaning device. That is to say, the separation device 500 according to embodiments can be used to increase the purity of hydrogen, or any other gas that can flow through the membranes 201.

As shown in FIG. 4B, the mesh may be a plate that comprises a plurality of channels, with each of said plurality of channels being a second channel 204. The mesh has been described as steel mesh. Embodiments include the mesh being made of any other material that has the property of providing the required structural support. The mesh may have any structure that supports the substrates 203 that are attached to the mesh.

The membranes 201 have been described as having square-shaped planes. However, embodiments include the planes having other-shaped planes, such as circular planes or rectangular planes.

The hydrogen frames 301 and syngas frames 404 may comprise conduits. The flow paths of the hydrogen, syngas and/or retentate gas may be through these conduits in addition to, or instead of, the inlet/outlet channels 501, 502, 503 and 504.

Embodiments have been described with the separation device 500 comprising gas separation sections 300 with planar membranes. Although this is a preferred implementation of embodiments, embodiments also include the use of tubular membranes in the separation device 500. The membranes, substrate and mesh would have a tubular/cylindrical structure but otherwise may be substantially as described for the planar membranes according to embodiments.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A gas separation section for separating a first gas from one or more other gasses in a separation device, the gas separation section comprising:
   a first membrane that is planar;
   a second membrane that is planar;
   a first substrate that has a first surface and a second surface, wherein the second surface of the first substrate is on an opposite side of the first substrate than the first surface of the first substrate;
   a second substrate that has a first surface and a second surface, wherein the second surface of the second substrate is on an opposite side of the second substrate than the first surface of the second substrate; and
   a mesh that is arranged between the second surface of the first substrate and the second surface of the second substrate;
   wherein:
   the first substrate and the second substrate are sintered plates;
   the first membrane is on the first surface of the first substrate;
   the second membrane is on the first surface of the second substrate;
   the first and second membranes are both permeable by at least a first gas and not permeable by one or more other gasses;
   the thickness of the first membrane in a direction orthogonal to the plane of the first membrane is less than 10 micrometres; and
   the thickness of the second membrane in a direction orthogonal to the plane of the second membrane is less than 10 micrometres.

2. The gas separation section according to claim 1, wherein the first gas is hydrogen and the one or more other gasses include carbon monoxide and/or carbon dioxide.

3. The gas separation section according to claim 1 wherein:
   the first and second membranes comprise palladium;
   the first and second membranes further comprise one or more other metals than palladium;
   the first and/or second membrane comprises silver; and
   the membrane is between 15 wt % to 40 wt % silver with the rest of the membrane being palladium.

4. The gas separation section according to claim 1, wherein said thickness of the first and/or second membrane is between 0.2 and 4 micrometres.

5. The gas separation section according to claim 1, the first and second membranes are square shaped.

6. The gas separation section according to claim 1, wherein the mesh is a steel mesh.

7. The gas separation section according to claim 1, wherein:
   the mesh is attached to the second surface of the first substrate at a plurality of locations between opposite edges of the second surface of the first substrate; and
   the mesh is attached to the second surface of the second substrate at a plurality of locations between opposite edges of the second surface of the second substrate.

8. The gas separation section according to claim 1, wherein the mesh is attached to both the first substrate and the second substrate such that the mesh attachments hold the second surface of the first substrate and the second surface of the second substrate substantially parallel to each other; and
   wherein the second surface of the first substrate is separated from the second surface of the second substrate by a distance in the range 2 mm to 30 mm.

9. The gas separation section according to claim 1, wherein:
   the thickness of the first substrate is less than 3 mm; and/or
   the thickness of the second substrate is less than 3 mm.

10. The gas separation section according to claim 1, wherein the gas separation device further comprises:
    a first gasket that is arranged to provide a gas seal at the edges of the first membrane; and
    a second gasket that is arranged to provide a gas seal at the edges of the second membrane.

11. The gas separation section according to claim 1, wherein the mesh is arranged in a channel that, in use, the first gas is arranged to flow through; and
    wherein the gas separation device further comprises at least one frame that is arranged to provide a flow path of the first gas;
    wherein the at least one frame is arranged to be in fluid communication with the channel such that, in use, the first gas flows from the channel into the flow path provided by the frame;
    wherein the frame comprises a substantially annular section that encircles the first and second membranes.

12. The gas separation section according to claim 1, wherein the gas separation device further comprises:
    a first gasket that is arranged to provide a gas seal at the edges of the first membrane; and
    a second gasket that is arranged to provide a gas seal at the edges of the second membrane;
    wherein the first gasket is a single piece structure that comprises a square section within an annular section; and/or
    the second gasket is a single piece structure that comprises a square section within an annular section.

13. A separation device for separating a first gas from one or more other gasses, the separation device comprising:
    an inlet for receiving a gas mixture comprising a first gas and one or more other gasses;
    a plurality of gas separation sections, wherein the plurality of gas separation sections are arranged in a stack;
    a first outlet arranged to output the first gas that has passed through one or more membranes in the one or more gas separation sections; and a second outlet arranged to output at least the one or more other gasses that have not passed through one or more of the membranes in the one or more gas separation sections;

wherein each gas separation section comprises:

a first membrane that is planar;

a second membrane that is planar;

a first substrate that has a first surface and a second surface, wherein the second surface of the first substrate is on an opposite side of the first substrate than the first surface of the first substrate;

a second substrate that has a first surface and a second surface, wherein the second surface of the second substrate is on an opposite side of the second substrate than the first surface of the second substrate; and a mesh that is arranged between the second surface of the first substrate and the second surface of the second substrate;

wherein:

the first substrate and the second substrate are sintered plates;

the first membrane is on the first surface of the first substrate;

the second membrane is on the first surface of the second substrate;

the first and second membranes are both permeable by at least a first gas and not permeable by one or more other gasses;

the thickness of the first membrane in a direction orthogonal to the plane of the first membrane is less than 10 micrometres; and the thickness of the second membrane in a direction orthogonal to the plane of the second membrane is less than 10 micrometres.

14. The separation device according to claim 11, wherein the separation device further comprises an outer housing; and the plurality of gas separation sections are arranged within the outer housing;

wherein the outer housing is cylindrical;

wherein the first inlet is provided in an end section of the housing, such that, in use, the direction of flow of the gas mixture into the housing is orthogonal to the planes of the membranes in the gas separation sections;

wherein the housing further comprises an inlet that is arranged to receive steam for heating the gas separation sections; and wherein the housing further comprises an inlet for purge gas that, in use, is supplied to one or more channels that the first gas is arranged to flow through after the first gas has passed through a membrane.

15. A method of separating a first gas from a gas mixture comprising the first gas and one or more other gasses, the method comprising:

feeding the gas mixture into a separation device;

receiving a first gas flow from the separation device that comprises substantially only the first gas; and receiving a second gas flow from the separation device that comprises at least the one or more other gasses than the first gas;

wherein the separation device comprises:

an inlet for receiving a gas mixture comprising the first gas and one or more other gasses;

a plurality of gas separation sections, wherein the plurality of gas separation sections are arranged in a stack;

a first outlet arranged to output the first gas that has passed through one or more membranes in the one or more gas separation sections; and a second outlet arranged to output at least the one or more other gasses that have not passed through one or more of the membranes in the one or more gas separation sections;

wherein each gas separation section comprises:

a first membrane that is planar;

a second membrane that is planar;

a first substrate that has a first surface and a second surface, wherein the second surface of the first substrate is on an opposite side of the first substrate than the first surface of the first substrate;

a second substrate that has a first surface and a second surface, wherein the second surface of the second substrate is on an opposite side of the second substrate than the first surface of the second substrate; and a mesh that is arranged between the second surface of the first substrate and the second surface of the second substrate;

wherein:

the first substrate and the second substrate are sintered plates;

the first membrane is on the first surface of the first substrate;

the second membrane is on the first surface of the second substrate;

the first and second membranes are both permeable by at least a first gas and not permeable by one or more other gasses;

the thickness of the first membrane in a direction orthogonal to the plane of the first membrane is less than 10 micrometres; and the thickness of the second membrane in a direction orthogonal to the plane of the second membrane is less than 10 micrometres.

* * * * *